US008447293B2

(12) United States Patent
Stapleton et al.

(10) Patent No.: US 8,447,293 B2
(45) Date of Patent: May 21, 2013

(54) METHODS AND APPARATUS TO ANALYZE COMMUNICATION SYSTEM TRANSCEIVERS

(75) Inventors: Padraig Stapleton, Pleasanton, CA (US); Hing On Ngai, Plano, TX (US); Benjamin Ip, Allen, TX (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1279 days.

(21) Appl. No.: 12/140,896

(22) Filed: Jun. 17, 2008

(65) Prior Publication Data

US 2009/0311966 A1 Dec. 17, 2009

(51) Int. Cl.
*H04W 24/00* (2009.01)
(52) U.S. Cl.
USPC ............... 455/424; 455/67.11; 455/67.15; 455/68; 455/561; 455/423
(58) Field of Classification Search
USPC ............ 455/423–425, 436–443, 522, 67.11, 455/67.13, 67.15, 68–69, 561; 370/241, 241.1, 370/331, 335
See application file for complete search history.

(56) References Cited

U.S. PATENT DOCUMENTS

| | | | |
|---|---|---|---|
| 6,101,175 A * | 8/2000 | Schorman et al. | 370/331 |
| 6,628,953 B1 * | 9/2003 | Dillon et al. | 455/452.1 |
| 6,717,547 B2 | 4/2004 | Spilker, Jr. et al. | |
| 6,999,766 B1 * | 2/2006 | Padovani | 455/437 |
| 7,194,281 B2 * | 3/2007 | Peng et al. | 455/522 |
| 7,203,510 B2 * | 4/2007 | Tanoue | 455/522 |
| 7,409,214 B2 * | 8/2008 | Lee | 455/436 |
| 7,734,309 B2 * | 6/2010 | Chi et al. | 455/522 |
| 7,885,239 B1 * | 2/2011 | Oroskar et al. | 370/336 |
| 2003/0235180 A1 * | 12/2003 | Oprescu-Surcobe et al. | 370/348 |
| 2005/0043046 A1 * | 2/2005 | Lee | 455/502 |
| 2005/0287954 A1 | 12/2005 | Lim et al. | |
| 2006/0089153 A1 | 4/2006 | Sheynblat | |
| 2007/0058678 A1 | 3/2007 | Thompson, III et al. | |
| 2007/0060084 A1 | 3/2007 | Thompson, III et al. | |
| 2007/0243864 A1 | 10/2007 | Jaquet | |

OTHER PUBLICATIONS

How to Interpret the Cellular/Mobile Equipment Maps, http://www.geckobeach.com/cellular/maps/mapsfaqs.php, downloaded Feb. 21, 2008, 4 pages.
CDMA Basics, from Dolcera Wiki, http://www.dolcera.com/wiki/index.php?title=CDMA_Basics, downloaded Feb. 21, 2008, 9 pages.
Google Press Center Announcement, Google Announces Launch of Google Maps for Mobile With "My Location" Technology, http://www.google.com/intl/en/press/annc/20071128_maps_mobile_my_ . . . , Nov. 28, 2007, 1 page.

* cited by examiner

*Primary Examiner* — Tuan A Tran
(74) *Attorney, Agent, or Firm* — Hanley, Flight & Zimmerman, LLC

(57) ABSTRACT

Methods and apparatus to monitor communication system transceivers are disclosed. For example, the disclosed system may determine the number and locations of available cellular stations. An example method includes receiving a first message from a base station, receiving a second message from the base station, extracting a first parameter from the first message, extracting a second parameter different from first parameter from the second message, determining if the first message and the second message were received from the same base station based on the first parameter and the second parameter, and reporting that the first message and the second message were from the same base station if the first message and the second message were received from the same base station. Some implementations of the disclosed methods and apparatus enable pseudorandom number codes received over-the-air from base stations to be grouped by base station.

25 Claims, 14 Drawing Sheets

OPERATION A

METHODS AND APPARATUS TO ANALYZE COMMUNICATION SYSTEM TRANSCEIVERS

FIELD OF THE DISCLOSURE

The present disclosure pertains to analyzing communication systems and, more particularly, to methods and apparatus to analyze communication system transceivers.

BACKGROUND

Mobile communication service providers establish base communication stations across their coverage areas to allow users of the communication services to communicate with the communication service throughout the coverage area. As users move throughout the coverage area, a communication session between a mobile device and the communication system is handled by one or more of the base stations. The placement of such base communication stations is typically not disclosed by the mobile communication service providers and is often intentionally kept as a secret.

Communications (e.g., messages) transmitted by base stations do not always uniquely identify the base station. For example, while communications according to the code division multiple access (CDMA) communication standard include a pseudo random (PN) number associated with the base station, each base station can include multiple PN numbers (e.g., here the base station includes multiple communication sectors (e.g., antennas)) and the PN numbers may not be unique throughout the communication system (e.g., two base stations may use the same PN number).

DETAILED DESCRIPTION

Figure 1:
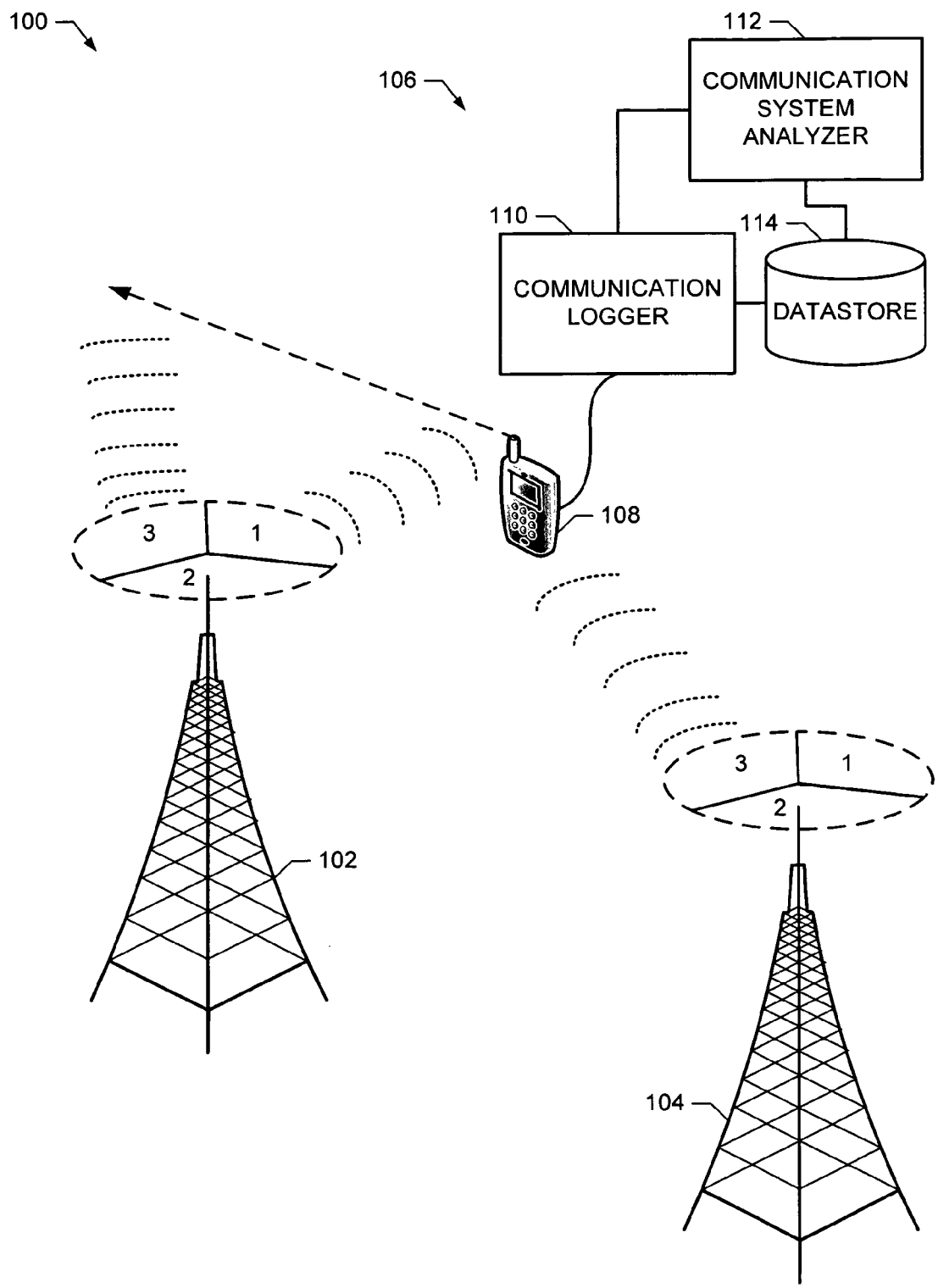
FIG. 1 is a block diagram of an example system in which a monitoring system is used to analyze communication system transceivers.

FIG. 1 is a block diagram of an example system 100 in which a monitoring system 106 is used to analyze communication system transceivers. The example monitoring system 106 may be used, for example, to determine the number of base stations in a particular communication system and/or a portion thereof. For example, all or part of the monitoring system 106 may be moved throughout a geographical area in which the communication system is located (e.g., all or part of the monitoring system 106 may be driven throughout a city in a vehicle). As the monitoring system 106 is moved throughout the city, messages received from base stations of the communication system are stored. Once a sufficient or desired number of messages has been stored, the messages are analyzed to determine how many base stations transmitted messages to the monitoring system 106. The results of the analysis are stored and/or reported by the example monitoring system 106.

The example system 100 includes a base station 102, a base station 104, and the monitoring system 106.

The example base station 102 and the example base station 104 are mobile telephone transceiver base stations that send messages to and receive messages from mobile telephones (e.g., mobile device 108) according to the code division multiple access (CDMA) communication standard. The example base stations 102 and 104 include three sectors illustrated by the divided circle above each of the base stations 102 and 104. Each sector includes communication circuitry (e.g., one or more antennas) to communicate with devices in a region extending radially from the base stations 102 and 104. The regions covered by each sector may be exclusive and/or may overlap. While the example base stations 102 and 104 include three sectors, any number of sectors may be included (i.e., one or more sectors) at each of the base stations 102 and 104. In addition, while the two base stations are illustrated in the example communication system any number of base stations may exist. The base stations 102 and 104 may be any type of base station for communicating with wireless devices and systems such as, for example, for communicating with a pager communication system, a wireless networking communication system, a citizen's band (CB) radio communication system, a broadcast radio system, a broadcast television system, etc. In addition, the base stations 102 and 104 may communicate with any type of mobile telephone system (e.g., a time division multiple access (TDMA) system, a global system for mobile communication (GSM) system, etc.).

One type of message that the base stations 102 and 104 transmit to and receive from the mobile device 108 in the example implementation of the system 100 that implements the CDMA standard is layer three (L3) messages. The L3 messages provide information about the mobile communication system to the mobile device 108. The type of information included in an L3 message depends on the state of communication between the base stations 102 and 104 and the mobile device 108. The example monitoring system 106 classifies communications in three states: idle, traffic, and init. The states and the transitions between states are described in further detail in conjunction with the state diagram of FIG. 8. During the idle state, L3 messages are parameter messages (System Parameter Messages (SPM)) that include the following parameters:
 a. BASE_LAT—The locational latitude of the base station transmitting the L3 message
 b. BASE_LONG—The locational longitude of the base station transmitting the L3 message
 c. PILOT_PN—A pseudo random offset assigned to the sector of the base station transmitting the L3 message
 d. BASE_ID—A unique identifier for the sector of the base station that sent the L3 message
 e. SID—A system identifier for the communication system
 f. NID—A network identifier for the communication network within the communication system
 g. SRC_WIN_A—A window in chips (i.e., maximum distance) used by the mobile device to search for candidate pilots (i.e., signals from base station transmitters)

During the init and traffic states, L3 messages are strength messages (Pilot Strength Measurement Messages (PSMM) and Periodic Pilot Strength Measurement Messages (PPSMM)) and handoff messages (Handoff Direction Messages (HDM)). Strength messages include the following parameters:
 a. REF_PN—A pseudo random offset assigned to the sector of the base station transmitting the L3 message
 b. PILOT_PN_PHASE—The phase relative to the zero offset of the pilot
 c. PILOT_STRENGTH—Chip energy of the pilot with respect to the total power spectral density Handoff messages include the following parameters:
 a. PILOT_PN—A pseudo random offset assigned to the sector of the base station transmitting the L3 message
 b. PWR_COMB_IND—Indicates whether the Forward Traffic Channel associated with a pilot carries the same closed-loop power control subchannel bits as the previous pilot in the message
 c. SRC_WINA—A window in chips (i.e., maximum distance) used by the mobile device to search for candidate pilots (i.e., signals from base station transmitters)

While the example system 100 and, more particularly, the base stations 102 and 104 utilize the aforementioned message structures, the example system 100 may alternatively be implemented using any type of messages for any communication standard. For example, as is described in further detail herein, the system 100 may be implemented by a system that transmits and/or receives any type of messages that include a semi-unique (e.g., unique for a particular subset of a network, but not necessarily unique throughout the entire communication system) identifier for a base station and/or sector of a base station.

The monitoring system 106 of the illustrated example communicates with the base stations 102 and 104 and monitors such communications to analyze the transceivers of the communication system 100. The example monitoring system 106 includes the mobile device 108, a communication logger 110, a communication system analyzer 112, and a datastore 114.

The mobile device 108 of the illustrated example is a mobile telephone that communicates with the base stations 102 and 104. The example mobile device 108 is a mobile phone that has not been substantially modified (outside of normal user operation) other than having the communication logger 110 attached to an available port of the mobile device 108. Because the mobile device 108 of the illustrated example can be utilized without substantial modification, many different types of mobile devices can be easily used. However, in some implementations modification of the mobile device 108 may be desired and/or required.

As the mobile device 108 communicates with the base stations 102 and 104 during normal operation of the mobile device 108, the communication logger 110 receives and stores some or all of the communications (e.g., L3 messages) in the datastore 114. The mobile device 108 may be used in any desired manner during such an operation. For example, the mobile device 108 may be powered-on but idle, may be receiving a communication (e.g., a telephone call, a text message, an email message, etc.) from the base stations 102 and/or 104, may be placing or in the midst of a telephone call, etc.

According to the illustrated example, the mobile device 108 is transported throughout a geographic area and, thus, enters and leaves the various signal areas of the sectors of the base stations 102 and 104. For example, the mobile device 108 may be placed in a vehicle that follows a pre-mapped route that is designed to maximize exposure to a communication system or coverage of a geographical area. According to the illustrated example, the communication logger 110 is connected to the mobile device 108 while the mobile device 108 is transported. Alternatively, the mobile device 108 may include storage and be configured with the capability to store communication messages. According to such an example, the communication logger 110 is connected to a later time to retrieve (i.e., download) the stored communication messages.

The example communication logger 110 is a system that retrieves, captures, and/or monitors communication messages at the mobile device 108 and stores the communication messages in the datastore 114. An example communication logger 110 is the Invex3G® wireless network drive test system from Andrew® Wireless Solutions. However, any device, software, or system that is capable of retrieving, capturing, and/or monitoring communications at the mobile device 108 may be used. For example, the communication logger 110 may be software, devices, or systems that are integrated in the mobile device 108. Conversely, the mobile device 108 may be integrated with the communication logger 110 (i.e., the monitoring system 106 may not include a mobile device 108 separate from the communication logger 110). While the example monitoring system 106 includes a single mobile device 108 and a single communication logger 110, other implementations may include any number of each. For example, an example monitoring system 106 may include multiple mobile devices 108 and a single communication logger 110.

The example datastore 114 may be any type of memory that is capable of storing messages and any other logging data from the mobile device 108 and/or the communication logger 110. For example, the datastore 114 may be a database, a flash memory, a hard disk drive, a floppy disk drive, a compact disc drive, a digital versatile disc drive, etc. The example datastore 114 may be integrated with and/or communicably attachable to the mobile device 108, the communication logger 110, and/or the communication system analyzer 112. The example datastore 114 may provide for retrieval of data by the communication system analyzer 112 and/or may transmit to the communication system analyzer 112.

The communication system analyzer 112 of the illustrated example receives and/or retrieves communication messages from the datastore 114 (e.g., directly and/or via the communication logger 110) and analyzes the communication messages to determine information about the base stations 102 and 104 (e.g., to determine the number of base stations and sectors thereof). The communication system analyzer 112 stores the determined information and/or reports the determined information. An example implementation of the communication system analyzer 112 is described in conjunction with FIGS. 2 and 4-12.

The example monitoring system 106 may be used, for example, by a consumer research company or communication system provider to analyze the density of base stations and reach such base stations in a communication system provided by a communication system provider. For example, the consumer reporting company or agency may analyze the communication systems of two competing mobile telephone service providers to determine which service has more base stations in a particular area.

Figure 2:
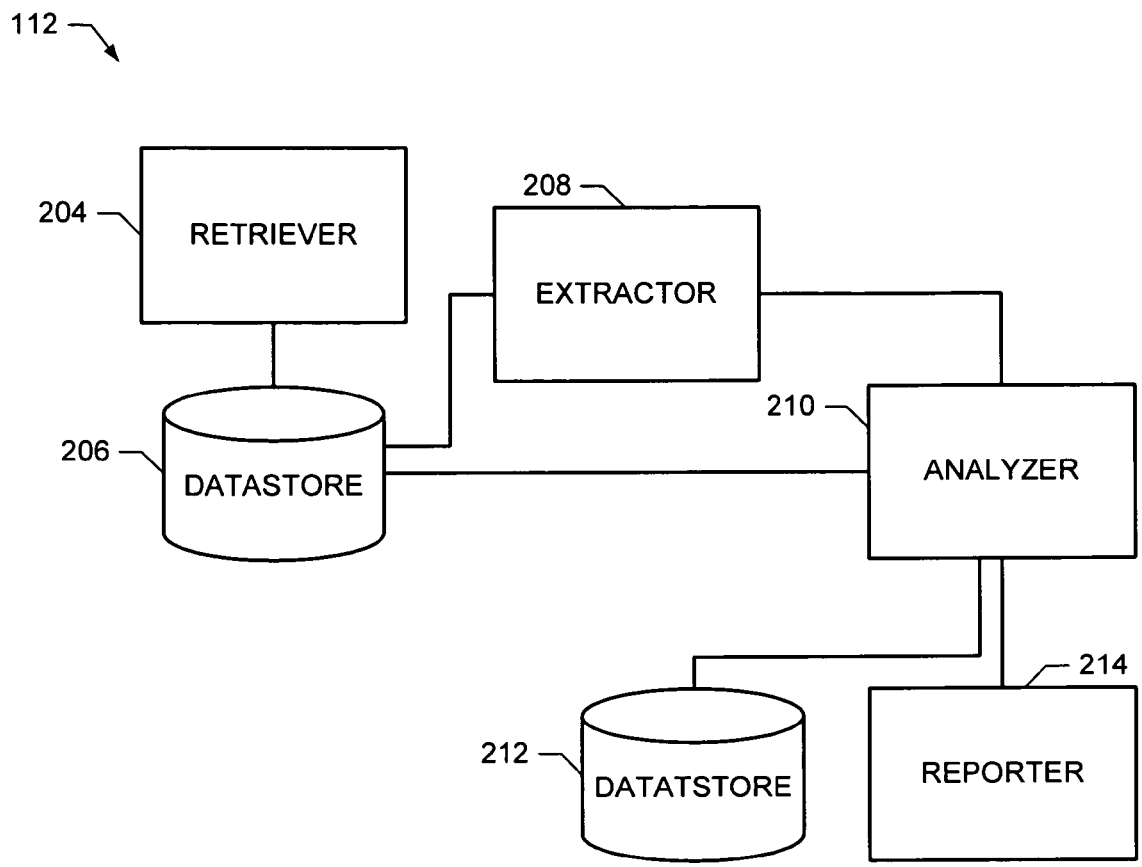
FIG. 2 is a block diagram of an example implementation of the communication system analyzer of FIG. 1.

FIG. 2 is a block diagram of an example implementation of the communication system analyzer 112 of FIG. 1. The example communication system analyzer 112 includes a retriever 204, a datastore 206, an extractor 208, an analyzer 210, a datastore 212, and a reporter 214.

The retriever 204 of the illustrated example retrieves messages stored in the datastore 114 by the communication logger 110 of FIG. 1. The example retriever 204 stores the messages in the datastore 206. Alternatively, the retriever 204 may transmit the messages to the extractor 208 for analysis. According to the illustrated example, the retriever 204 retrieves all of the messages stored in the datastore 114. Alternatively, the retriever 204 may retrieve messages for analysis as they are stored.

The example datastore 206 may be any type of memory that is capable of storing messages and any other logging data from the retriever 204. For example, the datastore 206 may be a database, a flash memory, a hard disk drive, a floppy disk drive, a compact disc drive, a digital versatile disc drive, etc. The example datastore 206 may be integrated with and/or communicably attachable to the retriever 204 and/or the extractor 208. While the example communication system analyzer 112 includes the datastore 206 and the datastore 212, the datastores 206 and 212 may alternatively be implemented as a single datastore. Additionally or alternatively, one or both of the datastores 206 and 212 may be implemented by the datastore 114 of FIG. 1.

The extractor 208 of the illustrated example retrieves messages from the datastore 206 and/or receives messages from the retriever 204 and extracts parameter values from the messages. The example extractor 208 transmits the parameters to the analyzer 210. For example, the extractor 208 of the illustrated example extracts PN offsets (e.g., PILOT_PN) from messages for analysis. In some implementations, the messages may be plain text messages from which the parameters can be read. In other implementations, the messages may be encrypted and/or encoded and, thus, the extractor 208 decrypts and/or decodes the messages appropriately to extract the parameters.

The example analyzer 210 analyzes parameters received from the extractor 208 to determine desired information about the communication system (e.g., the number of base stations 102 and 104). The analyzer 210 of the illustrated example receives PN offsets and groups the PN offsets by base station to determine the number of base stations. The example analyzer 210 stores the results of the analysis in the datastore 212 and/or transmits the results to the reporter 214. An example method for implementing the analyzer 210 is described in conjunction with FIGS. 4-12.

The example datastore 212 may be any type of memory that is capable of storing information and results from the analyzer 210. For example, the datastore 212 may be a database, a flash memory, a hard disk drive, a floppy disk drive, a compact disc drive, a digital versatile disc drive, etc. The example datastore 212 may be integrated with and/or communicably attachable to the analyzer 210 and/or the reporter 214.

The reporter 214 of the illustrated example receives results and/or information from the analyzer 210 and/or retrieves the results and/or information from the datastore 212 and generates and/or presents a report of the information. The reporter 214 may provide the information via a computer interface (e.g., a webpage on the internet), via a paper report, etc. In addition, the reporter 214 may transmit the report and/or information to any other source such as, for example, a client that commissioned a network analysis, a network provider whose network was analyzed, etc. While the example communication system analyzer 212 of FIG. 2 includes the datastore 212 and the reporter 214, the communication system analyzer 212 may alternatively include one of the datastore 212 and the reporter 214 when only one of storing the results and reporting the results is desired.

FIGS. 3-6 and 8-11 are flowcharts representative of example machine readable instructions that may be executed to implement the base station 102, the base station 104, the monitoring system 106, the mobile device 108, the communication logger 110, the communication system analyzer 112, and/or the datastore 114 of FIG. 1 and/or the retriever 204, the datastore 206, the extractor 208, the analyzer 210, the datastore 212, and/or the reporter 214 of FIG. 2. The example machine readable instructions of FIGS. 3-6 and 8-11 may be executed by a processor, a controller, and/or any other suitable processing device. For example, the example machine readable instructions of FIGS. 3-6 and 8-11 may be embodied in coded instructions stored on a tangible medium such as a flash memory, or random access memory (RAM) associated with a processor (e.g., the processor 1412 shown in the example processor platform 1400 and discussed below in conjunction with FIG. 14).

Alternatively, the example flowcharts of FIGS. 3-6 and 8-11 may be implemented using an application specific integrated circuit (ASIC), a programmable logic device (PLD), a field programmable logic device (FPLD), discrete logic, hardware, firmware, etc. In addition, the example flowcharts of FIGS. 3-6 and 8-11 may be implemented manually or as combinations of any of the foregoing techniques. For example, any or all of the base station 102, the base station 104, the monitoring system 106, the mobile device 108, the communication logger 110, the communication system analyzer 112, and/or the datastore 114 of FIG. 1 and/or the retriever 204, the datastore 206, the extractor 208, the analyzer 210, the datastore 212, and/or the reporter 214 of FIG. 2 may be implemented by a combination of firmware, software, and/or hardware.

Further, although in the example the base station 102, the base station 104, the monitoring system 106, the mobile device 108, the communication logger 110, the communication system analyzer 112, and/or the datastore 114 of FIG. 1 and/or the retriever 204, the datastore 206, the extractor 208, the analyzer 210, the datastore 212, and/or the reporter 214 of FIG. 2 is implemented by executing the example machine readable instructions represented by the flowcharts of FIGS. 3-6 and 8-11, many other methods of implementing instructions represented by FIGS. 3-6 and 8-11 may be employed. For example, the order of execution of the blocks may be changed, and/or some of the blocks described may be changed, eliminated, sub-divided, and/or combined. Additionally, the example machine readable instructions of FIGS. 3-6 and 8-11 may be carried out sequentially and/or carried out in parallel by, for example, separate processing threads, processors, devices, circuits, etc. When any of the appended claims are read to cover a purely software implementation, at least one of the base station 102, the base station 104, the monitoring system 106, the mobile device 108, the communication logger 110, the communication system analyzer 112, and/or the datastore 114 of FIG. 1 and/or the retriever 204, the datastore 206, the extractor 208, the analyzer 210, the datastore 212, and/or the reporter 214 of FIG. 2 are hereby expressly defined to include a tangible medium such as a memory, DVD, CD, etc.

Figure 3:
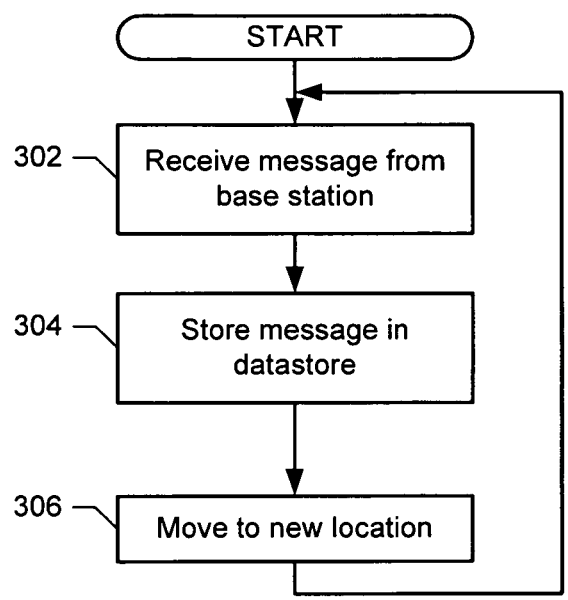
FIG. 3 is a flowchart representative of machine readable instructions that may be carried out to implement the combination of the mobile device and the communication logger of FIG. 1.

FIG. 3 is a flowchart representative of machine readable instructions that may be carried out to implement the combination of the mobile device 108 and the communication logger 110 of FIG. 1. While the mobile device 108 and the communication logger 110 are treated as a single apparatus for the purposes of the flowchart of FIG. 3, the devices may operate independently of each other. For example, the mobile device 108 may receive messages that are retrieved by the communication logger 110 at some time after such receipt.

The example machine readable instructions of FIG. 3 begin when the mobile device 108 receives one or more messages from one or more of the base stations 102 and 104 at a first geographical location (block 302). The example communication logger 110 stores the message(s) in the datastore 114 of FIG. 1 (block 304). In addition, the communication logger 110 may store any additional information that is available such as, for example, a current location identified by a global positioning system (GPS) device integrated with or attached to the communication logger 110.

The mobile device 108 and/or the communication logger 110 are then moved to a new location (block 306). While the illustrated example illustrates that machine readable instructions move the mobile device 108 and/or the communication logger 110 to a new location, movement to a new location may be performed by any other process. Moving the mobile device 108 causes the mobile device 108 to move into and out of the communication range of the sectors of the base stations 102 and 104. For example, a person may carry the mobile device 108 around a geographical area, a vehicle may transport the mobile device around a geographical area, etc.

After the example mobile device 108 and/or the example communication logger 110 are moved to a new location, control returns to block 302 to receive another message(s) from the base stations 102 and/or 104.

Figure 4:
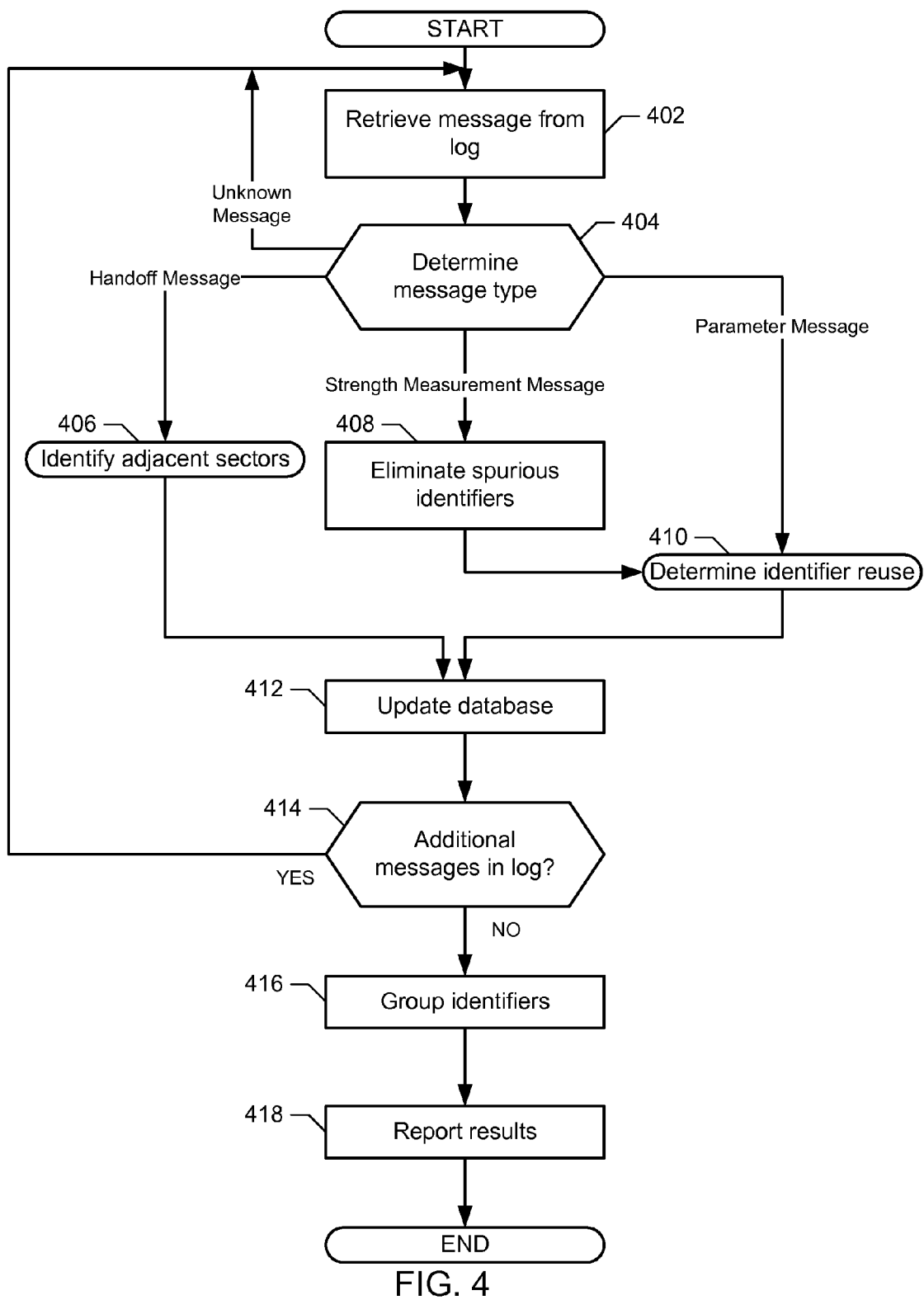
FIG. 4 is a flowchart representative of machine readable instructions that may be carried out to implement the communication system analyzer of FIG. 1.

FIG. 4 is a flowchart representative of machine readable instructions that may be carried out to implement the communication system analyzer 112 of FIG. 1. The flowchart of FIG. 4 begins when the retriever 204 of FIG. 2 retrieves one or more messages from the log of messages stored in the datastore 114 of FIG. 1 (block 402). According to the illustrated example, messages are retrieved one at a time as they are processed. Alternatively, all or some sub-set of the messages may be retrieved and then processed. For example, the messages retrieved may be stored in the datastore 206 and then processed.

After the message(s) are retrieved (block 402), the analyzer 210 determines the type of the message (e.g., a handoff message (e.g., HDM), a strength measurement message (e.g., PSMM or PPSMM), a parameter message (e.g., SPM), or an unknown message) (block 404). For example, the extractor 208 may extract a parameter indicative of the type of the message and the analyzer 210 may analyze the parameter. If the message is an unknown message (block 404), the message is ignored and control returns to block 402 to process the next message.

If the message is a handoff message (block 404), the analyzer 210 identifies adjacent sectors based on the message (block 406). An example process for identifying adjacent sectors (block 406) is described in conjunction with FIG. 5. In other words, the analyzer 210 determines if identifiers (e.g., PN offsets) from two or more messages are associated with sectors of the same one of the base stations 102 or 104 (e.g., the sectors are adjacent to each other at the one of the base stations 102 or 104). Control then proceeds to block 412, which is described below.

If the message is a strength measurement message (block 404), the analyzer 210 eliminates spurious identifiers (block 408). For example, the analyzer 210 may receive a PN offset and a distance or location of the base station sending the message extracted from the message by the extractor 208. If the distance or location indicates that the base station was further than a threshold distance, the message is ignored. For example, the message may compare the PILOT_PN_PHASE of an L3 message to a fraction (e.g., 80%) of the SRC_WIN_A and label the message as spurious in the datastore 114 if the PILOT_PN_PHASE is greater than the fraction of the SRC_WIN_A. Control then proceeds to block 410, which is described below.

If the message is a strength measurement message (block 404) or after eliminating spurious identifiers (block 408), the analyzer 210 determines if the identifier is reused (block 410). For example, the analyzer 210 receives the extracted PN offset from the extractor 208 and determines if the PN offset was used for another sector that was monitored (e.g., a PN was used for sector 1 of base station 102 and sector 3 of base station 104). Control then proceeds to block 412, which is described below. An example process for identifying adjacent sectors (block 406) is described in conjunction with FIG. 6.

After identifying adjacent sectors (block 406) or determining identifier reuse (block 410), the analyzer 210 stores the result of the analysis in the datastore 212 (block 412). For example, the analyzer 210 may store a record for the PN offset and label the record as adjacent to a sector and/or a reused PN offset when appropriate. Alternatively, in an implementation where the message data is accessed from a single datastore (e.g., where the datastores 114, 206, and 212 are implemented by a single database), the analyzer 210 may update a record that is already stored in the combined datastore. An example illustration of a database implemented according to such an example is described in conjunction with FIG. 12.

After storing results to and/or updating the database (block 412), the analyzer 210 and/or the extractor 208 determine if there are additional messages in the log (block 414). If there are additional messages in the log (block 414), control returns to block 402 to process the remaining messages.

Figure 13:
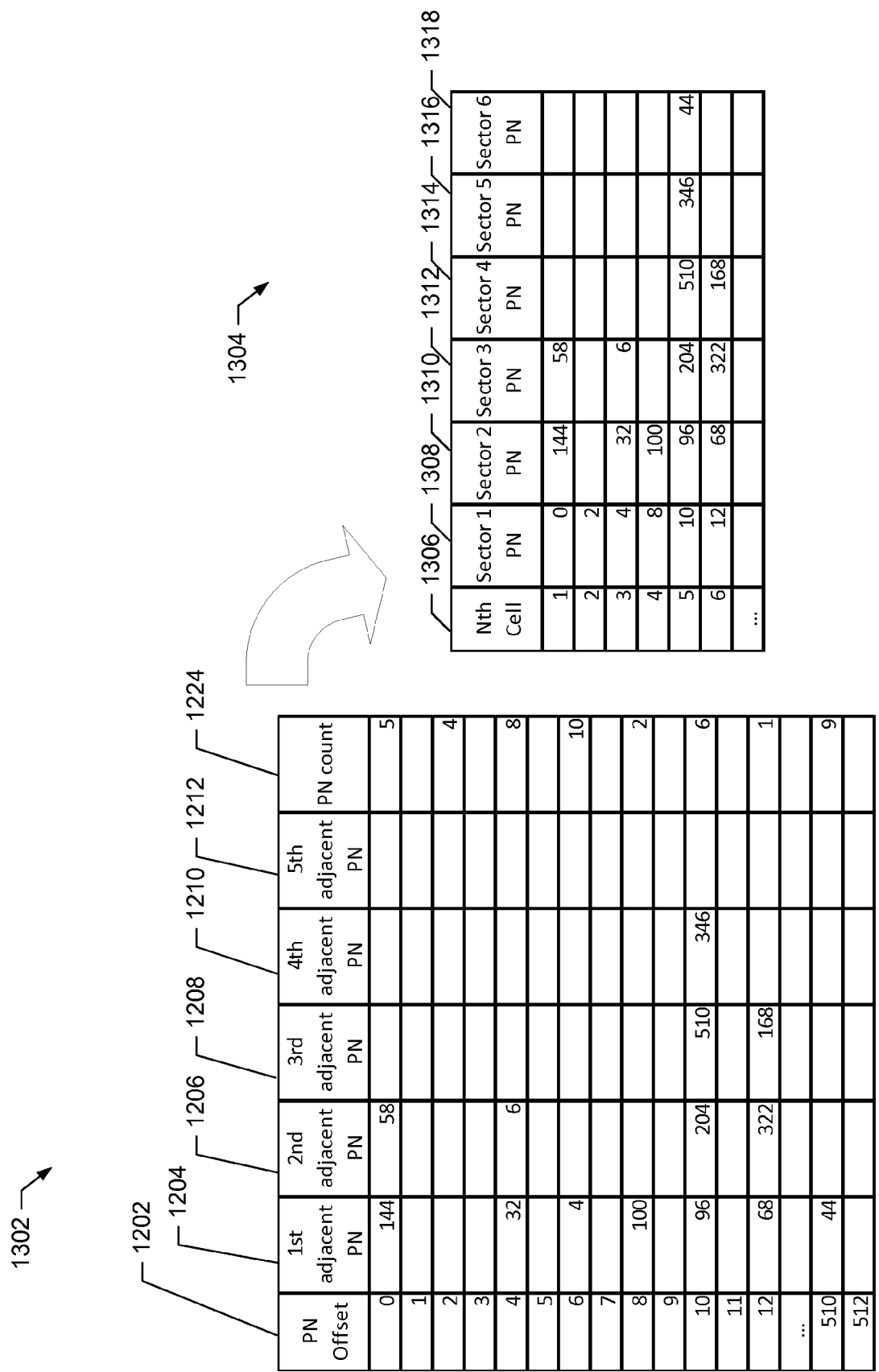
FIG. 13 is an illustration of how identifier information is grouped to determine the number of base stations.

If there are no further messages in the log (block 414), the analyzer 210 groups the retrieved identifiers by base station based on the results stored to or updated in the datastore 212 in block 412 (block 416). For example, all identifiers determined to be adjacent are grouped and labeled as a single base station and assigned the next consecutive cell identifier. The results are then stored in the datastore 212 and/or reported by the reporter 214 (block 418). An example table for storing the results of grouping is illustrated in FIG. 13.

Figure 5:
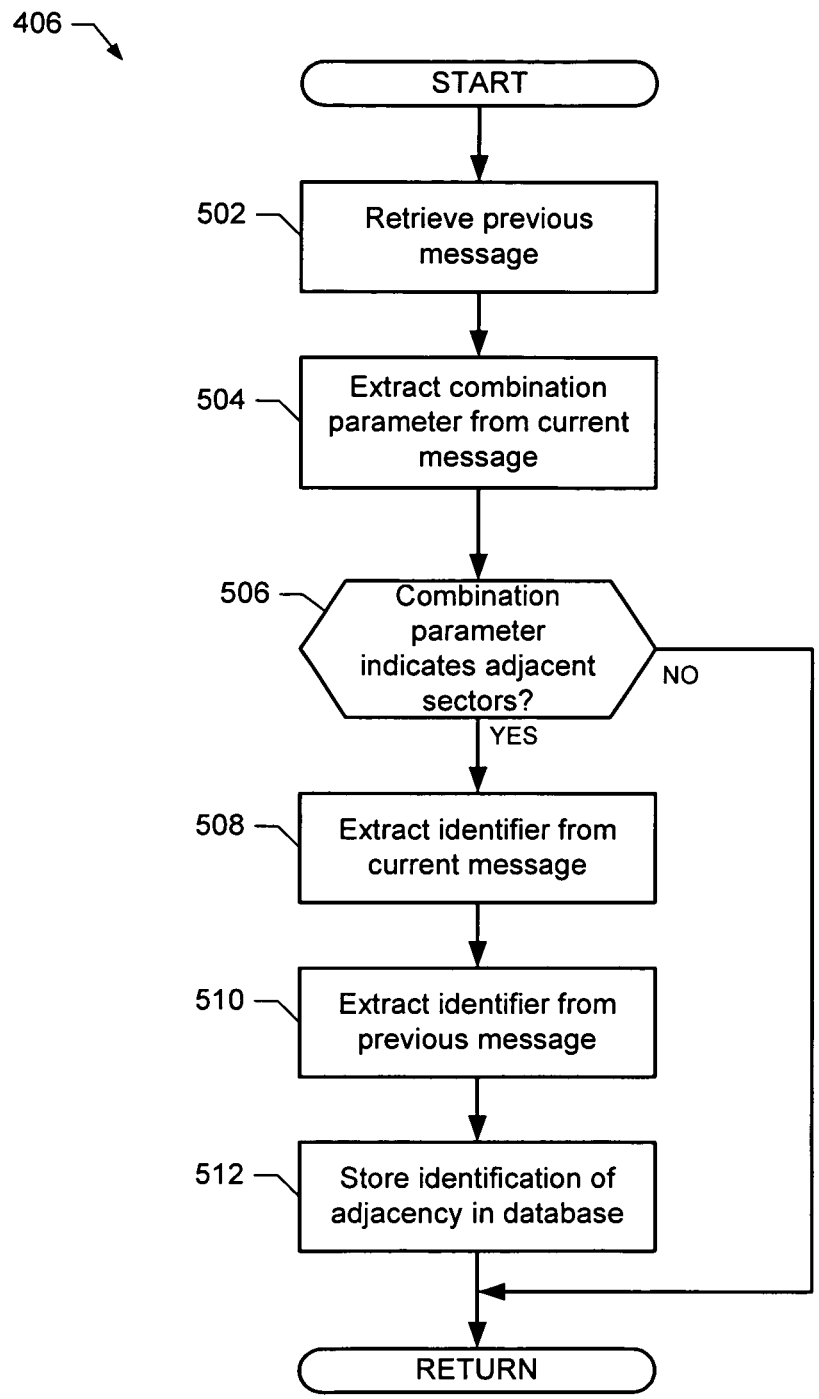
FIG. 5 illustrates example machine readable instructions that may be carried out to identify adjacent sectors.

FIG. 5 illustrates example machine readable instructions that may be carried out to identify adjacent sectors (block 406 of FIG. 4). The example flowchart of FIG. 5 begins when the retriever 204 retrieves the message that was prior to the current message (block 502). For example, the message may be the message immediately prior to the current message in the datastore 114 and/or may be the message that is temporally prior to the current message (e.g., when the datastore 114 includes messages associated with more than one communication system). The extractor 208 then extracts a combination parameter from the current message (block 504). For example, the combination parameter may be the PWR_COMB_IND of a CDMA L3 message. The PWR_COMB_IND parameter is a bit that, when set, indicates whether the forward traffic channel associated with the current message carries the same closed-loop power control subchannel bits as the previous message.

The analyzer 210 determines if the combination parameter is set (e.g., indicating that the current message and the previous message were sent by the same base station) (block 506). If the combination parameter is not set (block 506), the machine readable instructions of FIG. 5 are completed and control returns to the machine readable instructions of FIG. 4.

If the combination parameter is set (block 506), the extractor 208 extracts the identifier (e.g., PN offset) from the current message (block 508). The extractor 208 then extracts the identifier from the previous message (block 510). The analyzer 210 then stores an indication in the database 212 that the identifier from the current message is adjacent to the identifier from the previous message (block 512). For example, the datastore 210 may include (or be updated to include) a record for each of the identifier from the first message and the identifier from the second message. The record for the identifier from the first message may be updated to identify the identifier from the second message as an adjacent identifier (i.e., the sectors associated with the identifiers are adjacent). In addition, the record for the identifier from the second message may be updated to identify the identifier from the first message. Accordingly it can be determined that, while two different identifiers were received, only a single base station should be counted. The machine readable instructions of FIG. 5 terminate and control returns to the machine readable instructions of FIG. 4.

Figure 6:
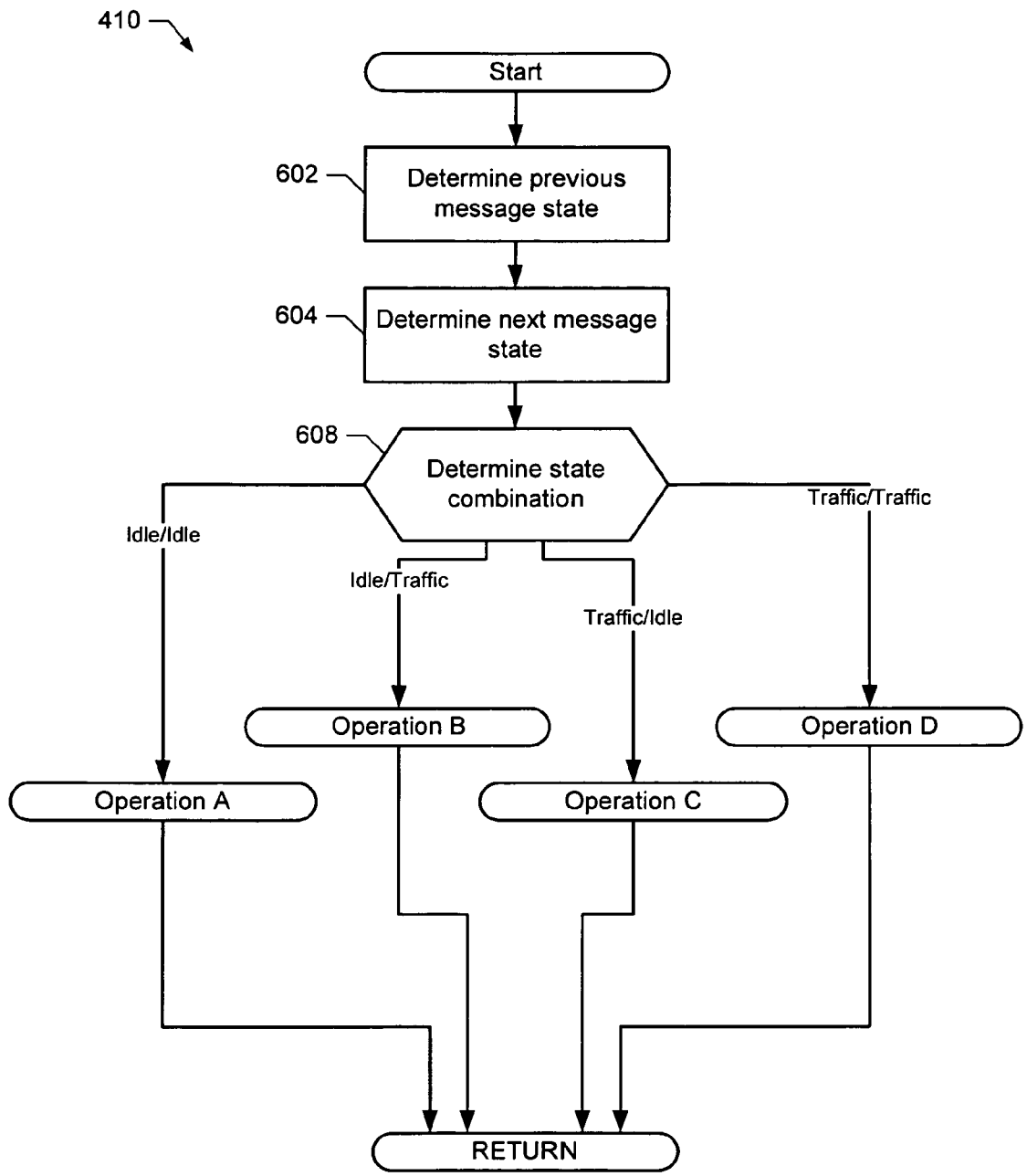
FIG. 6 is a flowchart representative of machine readable instructions that may be carried out to determine when an identifier has been used.

FIG. 6 is a flowchart representative of machine readable instructions that may be carried out to determine when an identifier (e.g., a PN offset) has been used (block 410 of FIG. 4). The flowchart of FIG. 6 begins when the analyzer 210 determines the state of the previous message (block 602). For example, the analyzer 210 may track the message state (e.g., the communication state classified by the monitoring system 106) based on the state diagram of FIG. 7. Alternatively, the extractor 208 may retrieve the previous message from the datastore 206 and extract an identifier indicative of the message state. The analyzer 210 then determines the state of the current message (i.e., the state that the mobile device 108 is transitioning into) (block 604). For example, the extractor 208 may extract a message type from the current message and the analyzer 210 may determine the next state based on the previous state and the message type using the state diagram of FIG. 7. The state diagram of FIG. 7 is described below.

The analyzer 210 then determines the state combination (e.g., the particular combination of previous state and next state) (block 608). Based on the state combination, a particular operation(s) is performed to determine if the identifier has been reused (i.e., to determine if the identifier has been received from a different base station). While the following describes separate operations for each combination of states, the same operation may be performed for multiple states.

Figure 8:
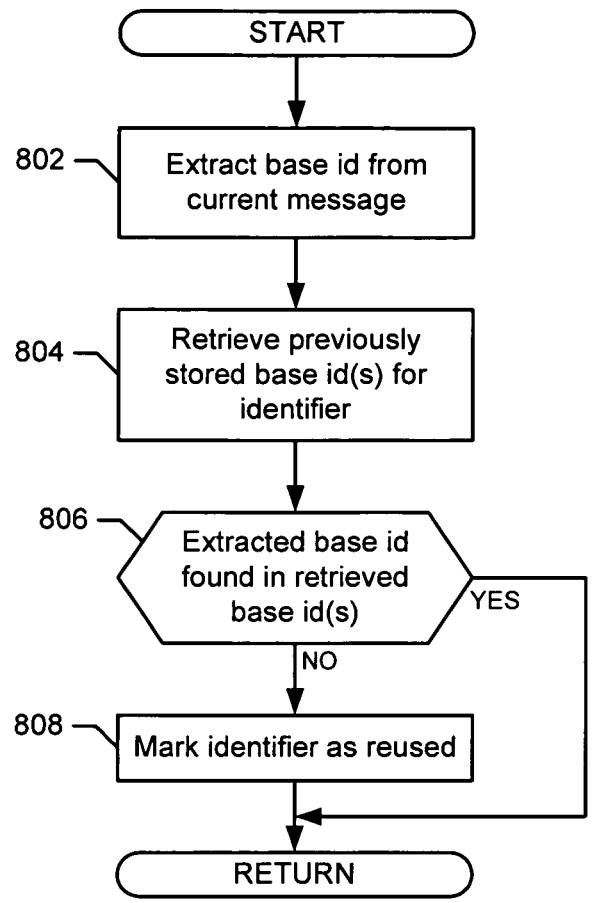
FIG. 8 is a flowchart representative of machine readable instructions that may be carried out to determine identifier reuse.
Figure 9:
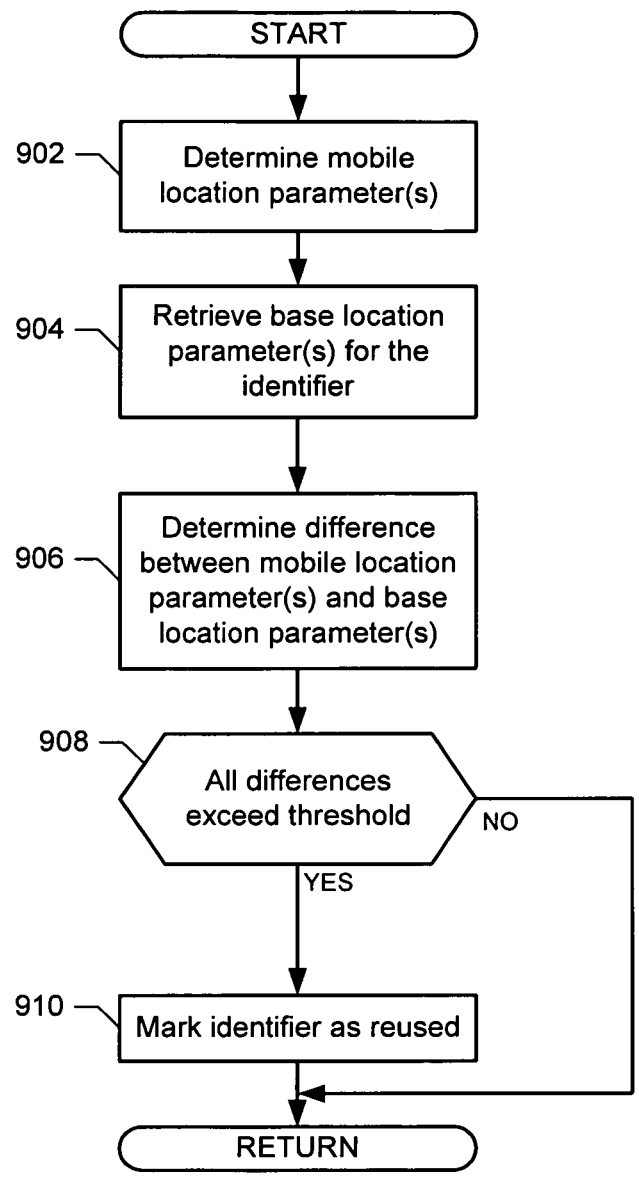
FIG. 9 is another flowchart representative of machine readable instructions that may be carried out to determine identifier reuse.

If the previous state was idle and the next state is idle (block 608), operation A, an example implementation of which is described in conjunction with FIG. 8, is performed and control then returns to block 412 of FIG. 4. If the previous state was idle and the next state is traffic (block 608), operation B, an example implementation of which is described in conjunction with FIG. 9, is performed and control then returns to block 412 of FIG. 4. If the previous state was traffic and the next state is idle (block 608), operation C, an example implementation of which is described in conjunction with FIG. 8, is performed and control then returns to block 412 of FIG. 4. If the previous state was traffic and the next state is traffic (block 608), operation D, an example implementation of which is described in conjunction with FIG. 8, is performed and control then returns to block 412 of FIG. 4.

Figure 7:
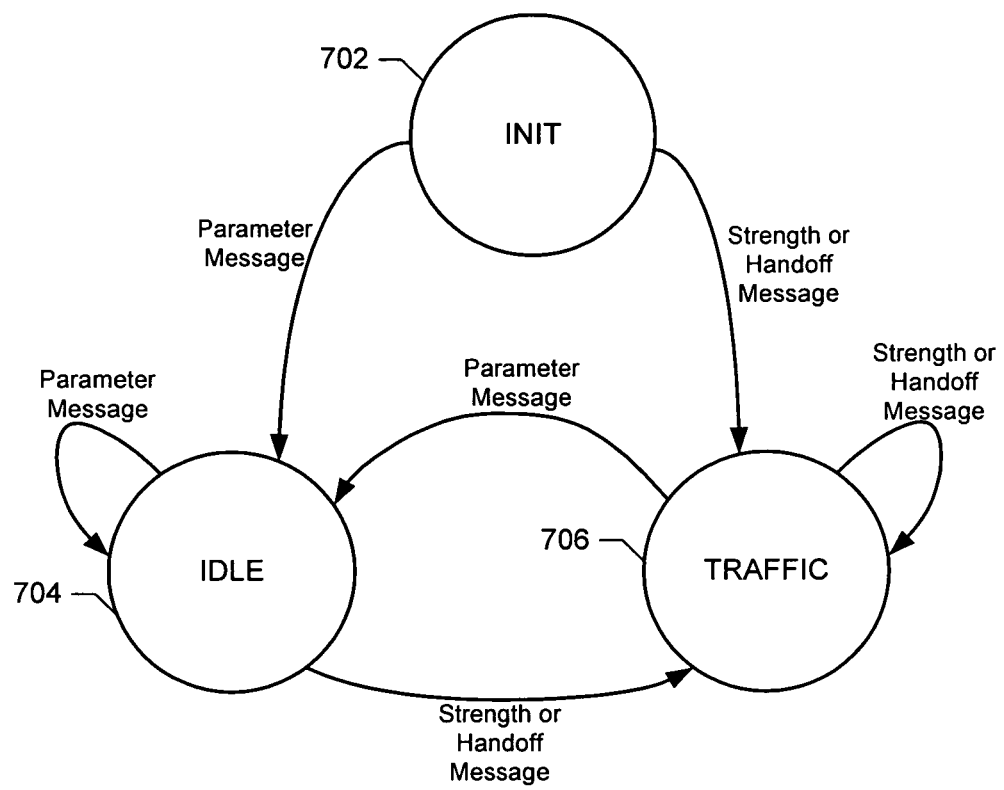
FIG. 7 is a state diagram illustrating an example state flow for communication between the mobile device and the base stations of FIG. 1.

FIG. 7 is a state diagram illustrating an example state flow for communication between the mobile device 108 and the base stations 102 and 104. The example state diagram includes three states: an init state 702, an idle state 704, and a traffic state 706. According to the example state diagram of FIG. 7, communication begins in the init state 702. When a parameter message is transmitted, communication transitions to the idle state 704. Alternatively, while in the init state 702, when a strength message or a handoff message is transmitted, communication transitions to the traffic state 706.

When in the idle state 704, a parameter message does not cause a transition to another state. According to the illustrated example, a strength message or a handoff message causes a transition from the idle state 704 to the traffic state 706.

When in the traffic state 706, a strength message or a handoff message does not cause a transition to another state. According to the illustrated example, a parameter message causes a transition from the traffic state 706 to the idle state 704.

Turning now to FIG. 8, a flowchart representative of machine readable instructions that may be carried out to determine identifier reuse is illustrated. According to the example illustrated in FIG. 6, the machine readable instructions of FIG. 8 are carried out when one or more messages between the mobile device 108 and one or more of the base stations 102 and 104 cause the mobile device 108 that is in the idle state to remain in the idle state. The flowchart of FIG. 8 begins when the extractor 208 extracts a base station identifier (e.g., BASE_ID) from the current message (i.e., a base station identifier associated with the identifier (e.g., PN offset)) (block 802).

The analyzer 210 then retrieves a set of one or more previously stored base station identifiers (e.g., base station identifiers from messages that have been previously analyzed) from the datastore 212 (block 804). The analyzer 210 compares the extracted base station identifier to the set of one or more previously stored base station identifiers to determine if the extracted base station identifier is listed in the set of one or more previously stored base station identifiers (block 806). If the extracted base station identifier is listed in the set of one or more previously stored base station identifiers (block 806), the machine readable instructions of FIG. 8 terminate and control returns to FIG. 6. In other words, the identifier (e.g., PN offset) has not been reused.

If the extracted base station identifier is not listed in the set of one or more previously stored base station identifiers (block 806), the identifier (e.g., PN offset) is marked as reused by another base station (block 808). For example, a new database table may be created each time that a reused identifier is determined to track the new instance of the identifier. The machine readable instructions of FIG. 8 then terminate and control returns to FIG. 6.

FIG. 9 is a flowchart representative of machine readable instructions that may be carried out to determine identifier reuse. According to the example illustrated in FIG. 6, the machine readable instructions of FIG. 9 are carried out when one or more messages between the mobile device 108 and one or more of the base stations 102 and 104 cause the mobile device 108 that is in the idle state to transition to the traffic state. The flowchart of FIG. 9 begins when the extractor 208 determines the location of the mobile device 108 (e.g., the extractor 208 may operate in conjunction with the retriever 204 to retrieve location information from a global positioning system provided by the communication logger 110 and/or may retrieve location information from the datastore 206 stored in association with messages) (block 902). The extractor 208 then extracts location information for one or more base stations associated with the identifier of the current message (e.g., the PN offset) (e.g., the base stations 102 or 104) that transmitted the message (block 904). For example, the extractor 208 may retrieve location information stored in the datastore 206.

The example analyzer 210 then determines one or more difference (e.g., a distance) between the location information associated with the mobile device 108 and the one or more the base stations that transmitted messages with the identifier from the current message (block 906). Then, the analyzer 210 determines if any of the one or more differences exceeds a threshold (block 908). In other words, the analyzer 210 determines if any of the base stations that sent messages having the same identifier as the current message are further than a threshold distance from the mobile device. In the illustrated example, the analyzer 210 determines if the distance between the mobile device 108 and the base station is greater than 5 miles. If none of the differences exceeds the threshold (e.g., the one or more base stations are within a predetermined distance from the mobile device 108), the instructions of FIG. 9 terminate and control returns to FIG. 6. In other words, it is determined that the identifier has not been reused based on the assumption that the same identifier is not used for overlapping geographical areas (e.g., two base stations within the threshold distance will not be configured by the provider to use the same identifier for any of the sectors of the base stations).

If the difference exceeds the threshold (block 908), the analyzer 210 marks the identifier as reused (block 910). In other words, it is determined that a base station, different from the currently communicating base station, further away than the threshold distance used the same identifier. For example, a new database table may be created each time that a reused identifier is determined to track the new instance of the identifier. The machine readable instructions of FIG. 9 then terminate and control returns to FIG. 6.

Figure 10:
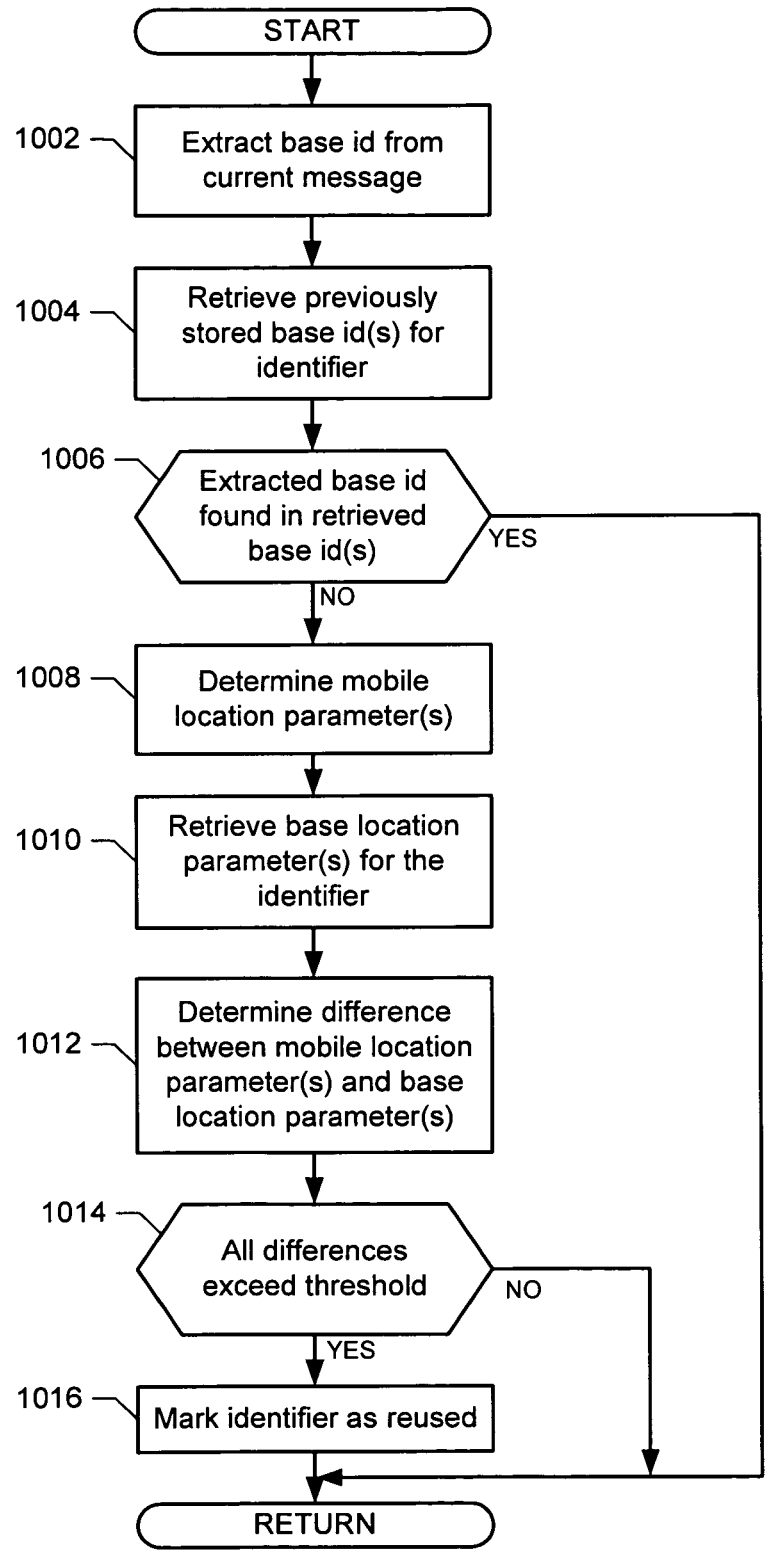
FIG. 10 is another flowchart representative of machine readable instructions that may be carried out to determine identifier reuse is illustrated.

Turning now to FIG. 10, a flowchart representative of machine readable instructions that may be carried out to determine identifier reuse is illustrated. According to the example illustrated in FIG. 6, the machine readable instructions of FIG. 10 are carried out when one or more messages between the mobile device 108 and one or more of the base stations 102 and 104 cause the mobile device 108 that is in the traffic state to transition to the idle state. The flowchart of FIG. 10 begins when the extractor 208 extracts a base station identifier (e.g., BASE_ID) from the current message (i.e., a base station identifier associated with the identifier (e.g., PN offset)) (block 1002).

The analyzer 210 then retrieves a set of one or more previously stored base station identifiers (e.g., base station identifiers from messages that have been previously analyzed) from the datastore 212 (block 1004). The analyzer 210 compares the extracted base station identifier to the set of one or more previously stored base station identifiers to determine if the extracted base station identifier is listed in the set of one or more previously stored base station identifiers (block 1006). If the extracted base station identifier is listed in the set of one or more previously stored base station identifiers (block 1006), the machine readable instructions of FIG. 8 terminate and control returns to FIG. 6. In other words, the identifier (e.g., PN offset) has not been reused.

If the extracted base station identifier is not listed in the set of one or more previously stored base station identifiers (block 1006), the extractor 208 determines the location of the mobile device 108 (e.g., the extractor 208 may operate in conjunction with the retriever 204 to retrieve location information from a global positioning system provided by communication logger 110 and/or may retrieve location information from the datastore 206 stored in association with messages) (block 1008). The extractor 208 then extracts location information for one or more base stations associated with the identifier of the current message (e.g., the PN offset) (e.g., the base stations 102 or 104) that transmitted the message (block 1010). For example, the extractor 208 may retrieve location information stored in the datastore 206.

The example analyzer 210 then determines a difference (e.g., a distance) between the location information associated with the mobile device 108 and each of the base stations that transmitted messages with the identifier from the current message (block 1012). Then, the analyzer 210 determines if the difference exceeds a threshold (block 1014). In other words, the analyzer 210 determines if any of the base stations that sent messages having the same identifier as the current message are further than a threshold distance from the mobile device. In the illustrated example, the analyzer 210 determines if the distance between the mobile device 108 and the base station is greater than 5 miles. If the difference does not exceed the threshold (e.g., the base station is within a predetermined distance from the mobile device 108), the instructions of FIG. 10 terminate and control returns to FIG. 6. In other words, it is determined that the identifier has not been reused based on the assumption that the same identifier is not used for overlapping geographical areas (e.g., two base stations within the threshold distance will not be configured by the provider to use the same identifier for any of the sectors of the base stations).

If the difference exceeds the threshold (block 1014), the analyzer 210 marks the identifier as reused (block 1016). In other words, it is determined that a base station, different from the currently communicating base station, further away than the threshold distance used the same identifier. For example, a new database table may be created each time that a reused identifier is determined to track the new instance of the identifier. The machine readable instructions of FIG. 10 then terminate and control returns to FIG. 6.

Figure 11:
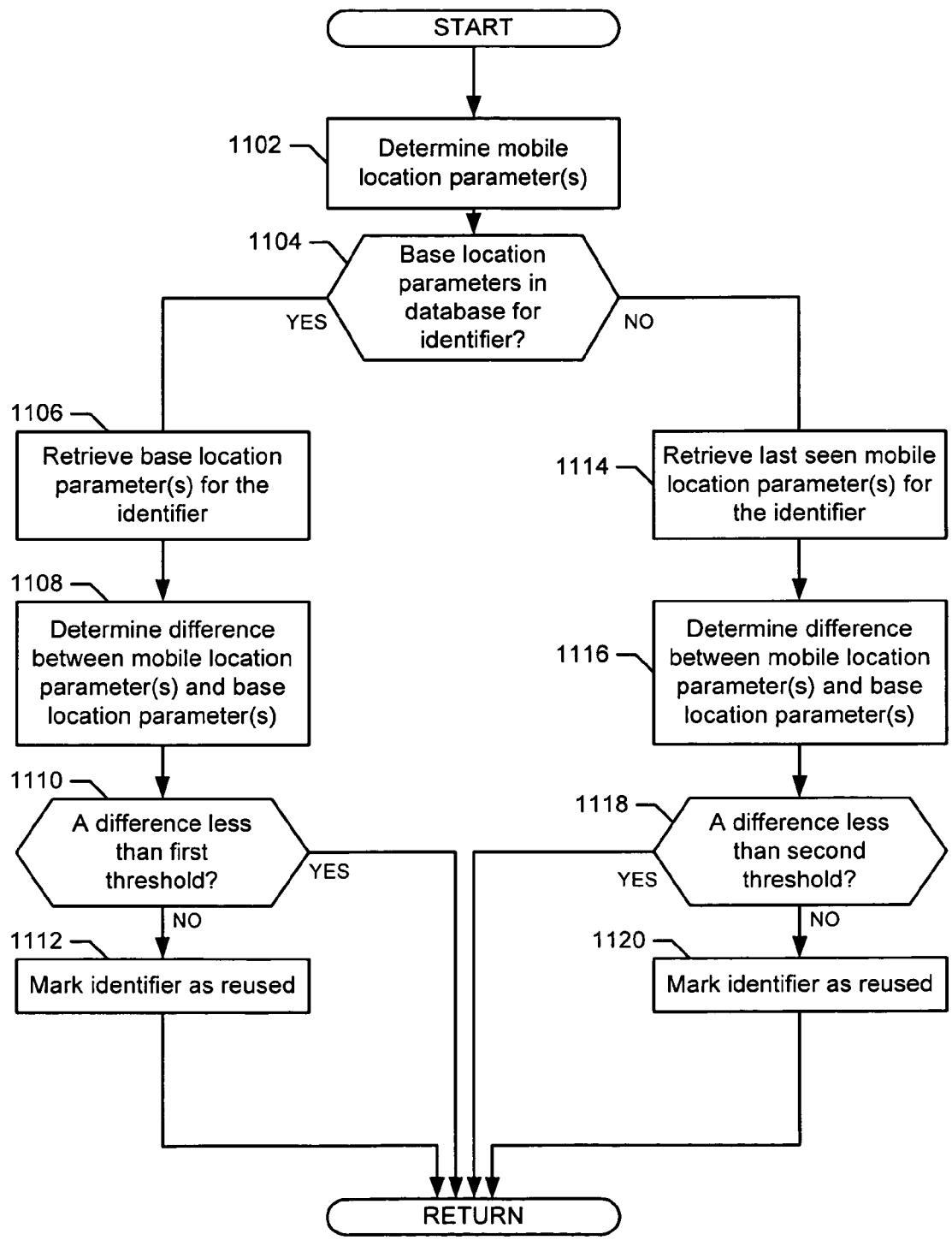
FIG. 11 is another flowchart representative of machine readable instructions that may be carried out to determine identifier reuse.

FIG. 11 is a flowchart representative of machine readable instructions that may be carried out to determine identifier reuse. According to the example illustrated in FIG. 6, the machine readable instructions of FIG. 11 are carried out when one or more messages between the mobile device 108 and one or more of the base stations 102 and 104 cause the mobile device 108 that is in the traffic state to remain in the traffic state. The flowchart of FIG. 11 begins when the extractor 208 determines the location of the mobile device 108 (e.g., the extractor 208 may operate in conjunction with the retriever 204 to retrieve location information from a global positioning system provided by the communication logger 110 and/or may retrieve location information from the datastore 206 stored in association with messages) (block 1102). The extractor 208 and/or the analyzer 210 then determine if location information for base stations associated with the identifier in the current message is stored in the datastore 206 (block 1104).

If location information for base stations associated with the identifier in the current message is stored in the datastore 206, the extractor 208 retrieves the location information (block 1106). The example analyzer 210 then determines a difference (e.g., a distance) between the location information associated with the mobile device 108 and each of the base stations that transmitted messages with the identifier from the current message (block 1108). Then, the analyzer 210 determines if the difference exceeds a first threshold (block 1110). In other words, the analyzer 210 determines if any of the base stations that sent messages having the same identifier as the current message are further than a threshold distance from the mobile device. In the illustrated example, the analyzer 210 determines if the distance between the mobile device 108 and the base station is greater than 5 miles. If the difference does not exceed the threshold (e.g., the base station is within a predetermined distance from the mobile device 108), the instructions of FIG. 11 terminate and control returns to FIG. 6. In other words, it is determined that the identifier has not been reused based on the assumption that the same identifier is not used for overlapping geographical areas (e.g., two base stations within the threshold distance will not be configured by the provider to use the same identifier for any of the sectors of the base stations).

If all of the differences exceed the threshold (block 1110), the analyzer 210 marks the identifier as reused (block 1112). In other words, it is determined that a base station, different from the currently communicating base station, further away than the threshold distance used the same identifier. For example, a new database table may be created each time that a reused identifier is determined to track the new instance of the identifier. The machine readable instructions of FIG. 11 then terminate and control returns to FIG. 6.

Returning to block 1104, if no location information for base stations associated with the identifier in the current message is stored in the datastore 206 (block 1104), the extractor 208 extracts the last seen mobile location parameters (e.g., a parameter identifying the last seen mobile device location transmitted in a strength message) for each of the one or more records having the same identifier as the identifier in the current message from the datastore 206 (block 1114). The example analyzer 210 then determines a difference (e.g., a distance) between the location information associated with the mobile device 108 and each of the last seen mobile station locations (block 1116).

Then, the analyzer 210 determines if the difference exceeds a second threshold (block 1118). In other words, the analyzer 210 determines if all of the last seen mobile stations are further than a threshold distance from the mobile device 108. In the illustrated example, the analyzer 210 determines if the distance between the mobile device 108 and the base station is greater than 10 miles. If at least one difference does not exceed the second threshold (e.g., the last seen mobile station is within a predetermined distance from the mobile device 108), the instructions of FIG. 11 terminate and control returns to FIG. 6. In other words, it is determined that the identifier has not been reused.

If all differences exceed the second threshold (block 1118), the analyzer 210 marks the identifier as reused (block 1120). For example, a new database table may be created each time that a reused identifier is determined to track the new instance of the identifier. The machine readable instructions of FIG. 11 then terminate and control returns to FIG. 6.

Figure 12:
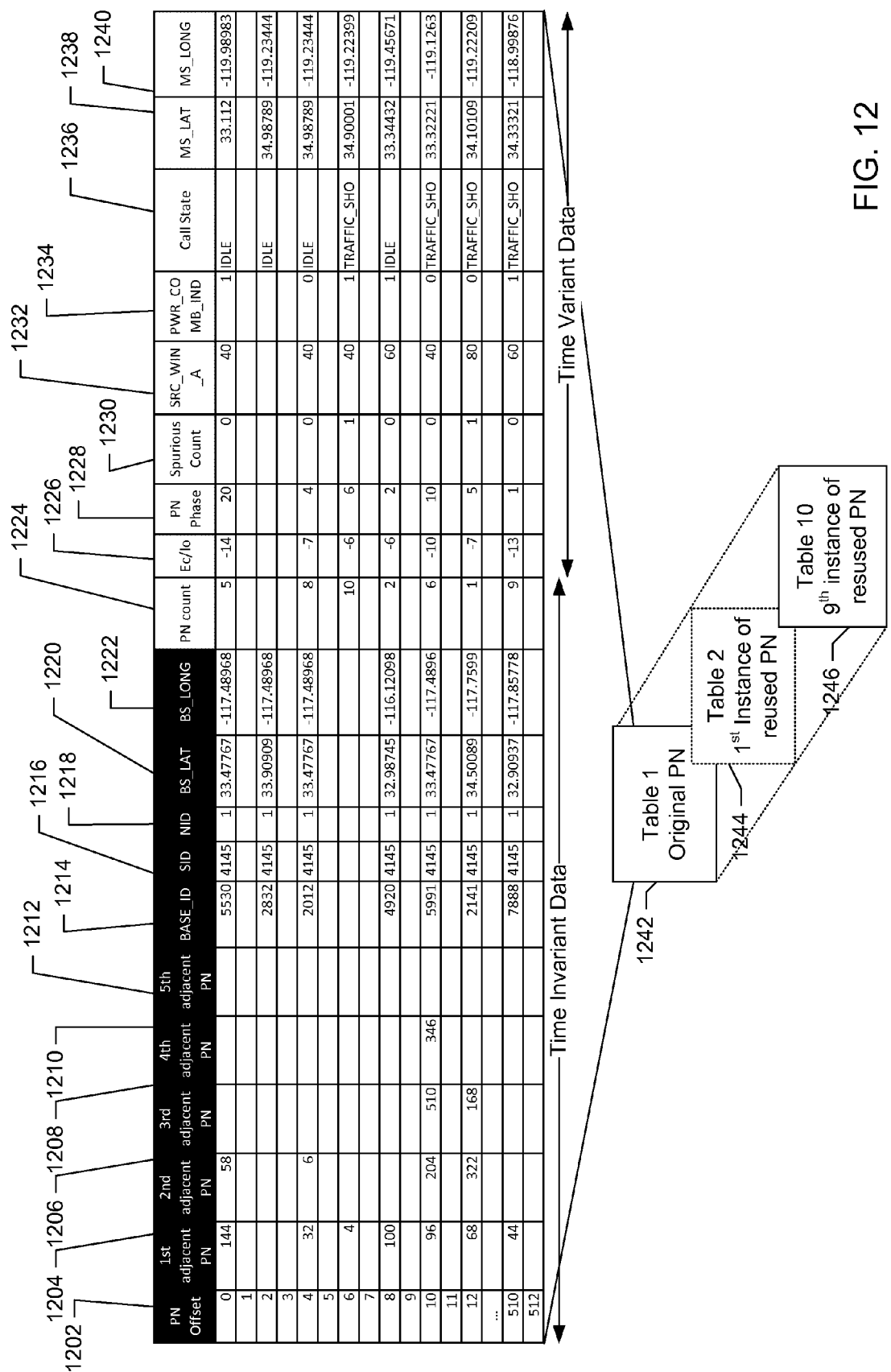
FIG. 12 is an illustration of an example database for storing message and analysis information for the communication logger and/or the communication system analyzer of FIG. 1.

FIG. 12 is an illustration of an example database for storing message and analysis information for the communication logger 110 and/or the communication system analyzer 112. The example database fields are divided into two types of fields: time invariant fields and time variant fields. Time invariant fields store data that does not change over time (e.g., as the mobile device 108 is moved throughout a communication system). Time variant fields store data that changes over time (i.e., the time variant fields store the last observed value for a particular parameter).

A PN offset field 1202 stores a PN offset value extracted from a message (i.e., the identifier for the sector that transmitted the message). A first adjacent PN field 1204, a second adjacent PN field 1206, a third adjacent PN field 1208, a fourth adjacent PN field 1210, and a fifth adjacent PN field 1212 store PN offset values that are determined to be adjacent to the PN offset identified in the PN offset field 1202.

A BASE_ID field 1214 stores a base station identifier for the base station that transmitted the message recorded in the database of FIG. 12. A SID field 1216 stores a system identifier for the communication system associated with the message. A NID field 1218 stores a network identifier for the network of the communication system associated with the message. A BS_LAT field 1220 stores a latitude value for identifying the location of the base station that transmitted the message. A BS_LONG field 1222 stores a longitude value for identifying the location of the base station that transmitted the message.

A PN count field 1224 stores an incrementing value representing the number of times that the PN offset identified in the PN offset field 1202 was analyzed. An Ec/Io field 1226 stores the last seen pilot chip energy to power spectral density ratio. A PN phase field 1228 stores the last PN phase. A Spurious count field 1230 stores an incrementing value representing the number of times that the PN offset was recognized as a spurious PN.

A SRC_WIN_A field 1232 stores the last search window size. A PWR_COMB_IND 1234 stores the value of the last power combination indicator. A Call State field 1236 stores the last call processing state (e.g., init, idle, traffic). An MS_LAT field 1238 stores a mobile station latitude for the location of the last seen mobile station. MS_LONG field 1240 stores a mobile station longitude for the location of the last seen mobile station.

The database illustrated in FIG. 12 includes ten tables (i.e., first table 1242, second table 1244, tables 3-9 (not illustrated), tenth table 1246) for storing multiple instances of a PN offset. In other words, the first table 1242 stores data associated with the first instance of a PN offset. The second table 1244 stores data associated with a second instance of the PN offset (e.g., for a PN offset that is reused and recognized at a second location in the communication system). In other words, the second table 1244 stores data associated with the first reuse. The tenth table 1246 stores data associated with a tenth instance of a PN offset (i.e., a ninth reuse).

While ten tables are illustrated in FIG. 12, any number of tables may be used. For example, the database may be designed to use as many tables as needed to provide a separate table for each instance of an identifier. Alternatively, the database may use a single table with multiple entries for each PN offset (e.g., may include a field including an instance identifier).

FIG. 13 is an illustration of how identifier information is grouped to determine the number of base stations (e.g., cells). The example of FIG. 13 includes table 1302 and table 1304. According to the illustrated example, table 1302 is a temporary table stored in memory (e.g., random access memory 1418 of FIG. 14) and is used to generate the table 1304 that is stored in the datastore 206 and/or the datastore 212 of FIG. 2. Alternatively, the table 1302 and/or the table 1304 may be stored in any combination of memory, datastore 206, datastore 212, and/or any other database or data storage.

The table 1302 includes the PN offset field 1202, the first adjacent PN field 1204, the second adjacent PN field 1206, the third adjacent PN field 1208, the fourth adjacent PN field 1210, the fifth adjacent PN field 1212, and the PN count field 1224. In other words, table 1302 illustrates a subset of the data in the database of FIG. 12.

The data in table 1302 is used by the analyzer 210 of FIG. 2 to generate table 1304 (e.g., in blocks 416 and 418 of FIG. 4). Table 1302 includes a cell identifier field 1306, a sector 1 PN field 1308, a sector 2 PN field 1310, a sector 3 PN field 1312, a sector 4 PN field 1314, a sector 5 PN field 1316, and a sector 6 PN field 1318. To generate the data for table 1302, the analyzer 210 locates the first PN offset where the PN counter field 1224 identifies a value greater than zero (e.g., PN offset 0 in the illustrated example). The analyzer 210 inserts the PN offset into the sector 1 PN field 1308 of the first available cell (e.g., cell 1 in the illustrated example). The analyzer 210 then inserts any values from the adjacent fields (1204-1212) in the remaining sector fields (1310-1318). The analyzer 210 then moves to the next PN offset that has a PN count field 1224 greater than zero. Each PN offset should only be added to one of the sector fields (1308-1318) one time. Therefore, if PN offset 0 is adjacent to PN offset 144 (as illustrated), the analyzer 210 should not add PN offset 144 to a new cell in addition to cell 1, that was started for PN offset 0. Accordingly, the number of cells indicates the determination of the number of base stations that were encountered.

While the example table 1304 includes fields for up to six sectors, any number of fields may be provided. For example, the database may be designed to include the same number of fields as the number of sectors at the base station with the greatest number of sectors.

Figure 14:
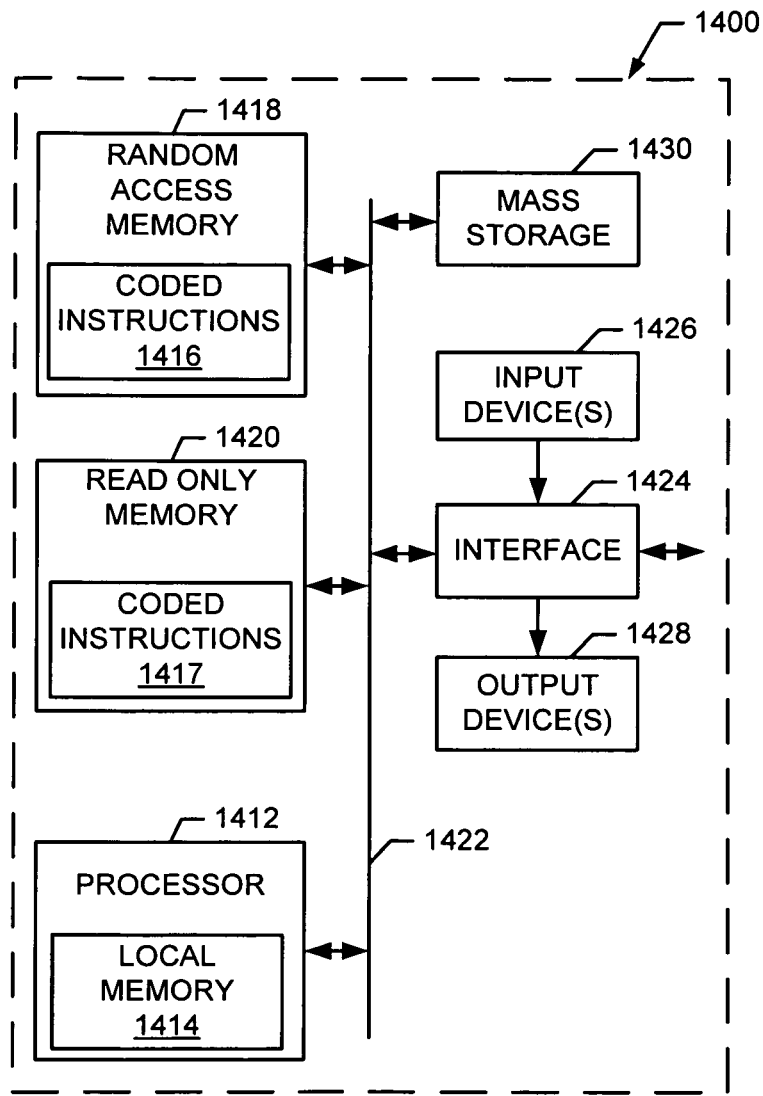
FIG. 14 is a block diagram of an example computer platform capable of executing the machine readable instructions illustrated in FIGS. 3-6 and 8-11 to implement the methods and/or apparatus disclosed herein.

FIG. 14 is a block diagram of an example computer platform 1400 capable of executing the machine readable instructions illustrated in FIGS. 3-6 and 8-11 to implement the base station 102, the base station 104, the monitoring system 106, the mobile device 108, the communication logger 110, the communication system analyzer 112, and/or the datastore 114 of FIG. 1 and/or the retriever 204, the datastore 206, the extractor 208, the analyzer 210, the datastore 212, and/or the reporter 214 of FIG. 2, and/or the other apparatus and/or methods disclosed herein.

The computer platform 1400 of the instant example includes a processor 1412 such as a general purpose programmable processor. The processor 1412 includes a local memory 1414, and executes coded instructions 1416 present in random access memory 1418, coded instruction 1417 present in the read only memory 1420, and/or instructions present in another memory device. The processor 1412 may execute, among other things, the machine readable instructions represented in FIGS. 3-6 and 8-11. The processor 1412 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1412 is in communication with a main memory including a volatile random access memory 1418 and a non-volatile read only memory 1420 via a bus 1422. The random access memory 1418 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 1420 may be implemented by flash memory and/or any other desired type of memory device. Access to the main memory 1418, 1420 is typically controlled by a memory controller (not shown) in a conventional manner.

The computer 1400 also includes a conventional interface circuit 1424. The interface circuit 1424 may be implemented by any type of well known interface standard, such as an Ethernet interface, a universal serial bus (USB), and/or a third generation input/output (3GIO) interface.

One or more input devices 1426 are connected to the interface circuit 1424. The input device(s) 1426 permit a user to enter data and commands into the processor 1412. The input device(s) can be implemented by, for example, a keyboard, a mouse, a touchscreen, a track-pad, a trackball, isopoint and/or a voice recognition system.

One or more output devices 1428 are also connected to the interface circuit 1424. The output devices 1428 can be implemented, for example, by display devices (e.g., a liquid crystal display, a cathode ray tube display (CRT), a printer and/or speakers). The interface circuit 1424, thus, typically includes a graphics driver card.

The interface circuit 1424 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1400 also includes one or more mass storage devices 1430 for storing software and data. Examples of such mass storage devices 1430 include floppy disk drives, hard drive disks, compact disk drives and digital versatile disk (DVD) drives.

The example methods and apparatus to analyze communication system transceivers are capable of performing monitoring during any communication state (e.g., init, idle, traffic). Accordingly, the example methods and apparatus can be used to determine the number of base stations, for example, during the traffic state when base station identifiers are not transmitted by base stations. Therefore, the example methods and apparatus allow can be used with a monitoring system that is performing other communication system analysis (e.g., call quality analysis that is performed in the traffic state). However, in other implementations of the disclosed methods and apparatus, communication system transceiver monitoring may only be performed in the init and idle state.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for analyzing a communication system, the method comprising:
   receiving a first message from a base station;
   receiving a second message from the base station;
   extracting a first parameter from the first message;
   extracting a second parameter different from the first parameter from the second message;
   determining if the first message and the second message were received from the same base station based on a third parameter; and
   reporting that the first parameter and the second parameter are associated with adjacent sectors of the same base station if the first message and the second message were received from the same base station.

2. A method as defined in claim 1, wherein at least one of the first parameter or the second parameter is an identifying number.

3. A method as defined in claim 2, wherein the identifying number is a pseudo-random number.

4. A method as defined in claim 1, wherein the first parameter is associated with a first sector of the base station and the second parameter is associated with a second sector of the base station.

5. A method as defined in claim 1, wherein determining if the first message and the second message were received from the same base station comprises:
   extracting the third parameter from the first message;
   determining if the third parameter indicates that the first parameter and the second parameter are associated with the same base station; and
   determining that the first message and the second message were received from the same base station when the third parameter indicates that the first parameter and the second parameter are associated with the same base station.

6. A method as defined in claim 1, further comprising:
   determining if a distance between the base station and a location to receive the first message is greater than a threshold; and
   reporting that first parameter is spurious when the distance is greater than the threshold.

7. A method as defined in claim 1, wherein reporting that the first parameter and the second parameter are associated with the adjacent sectors of the same base station comprises storing the first parameter and the second parameter in a first record of a database.

8. A method as defined in claim 7, further comprising:
   receiving a third message;
   extracting a fourth parameter from the third message, the fourth parameter being the same as the first parameter;
   determining that the third message and the first message were not received from the same base station; and
   storing the fourth parameter in a second record, different from the first record, in the database.

9. A method as defined in claim 8, wherein the first record is stored in a first table of the database and the second record is stored in a second table of the database.

10. An apparatus comprising:
    a receiver to receive a first message and a second message from a base station;
    an extractor to extract a first parameter from the first message and a second parameter from the second message;
    an analyzer to determine if the first message and the second message were received from the same base station based on a third parameter; and
    a reporter to store an indication in a memory that the first parameter and the second parameter are associated with adjacent sectors of the same base station when it is determined that the first message and the second message were received from the same base station.

11. An apparatus as defined in claim 10, wherein at least one of the first parameter or the second parameter is an identifying number.

12. An apparatus as defined in claim 11 wherein the identifying number is a pseudo-random number.

13. An apparatus as defined in claim 10, wherein the first parameter is associated with a first sector of the base station and the second parameter is associated with a second sector of the base station.

14. An apparatus as defined in claim 10, wherein to determine if the first message and the second message were received from the same base station the analyzer is to:
    extract the third parameter from the first message;
    determine whether or not the third parameter indicates that the first parameter and the second parameter are associated with the same base station; and
    determine that the first message and the second message were received from the same base station when the third parameter indicates that the first parameter and the second parameter are associated with the same base station.

15. An apparatus as defined in claim 10, wherein the analyzer is further to determine if a distance between the base station and a location receive the first message is greater than a threshold and the reporter is further to report that first parameter is spurious when the distance is greater than the threshold.

16. An apparatus as defined in claim 10, wherein the reporter is to that the first parameter and the second parameter are associated with the adjacent sectors of the same base station the reporter is to store the first parameter and the second parameter in a first record of a database.

17. An apparatus as defined in claim 16, wherein:
    the receiver is further to receive a third message;
    the extractor is further to extract a fourth parameter from the third message, the fourth parameter being the same as the first parameter;
    the analyzer is further to determine that the third message and the first message were not received from the same base station; and
    the reporter is further to store the fourth parameter in a second record, different from the first record, in the database.

18. An apparatus as defined in claim 17, wherein the first record is stored in a first table of the database and the second record is stored in a second table of the database.

19. A machine readable medium storing instructions that, when executed, cause a machine to:
    receive a first message from a base station;
    receive a second message from the base station;
    extract a first parameter from the first message;
    extract a second parameter different from the first parameter from the second message;
    determine if the first message and the second message were received from the same base station based on a third parameter; and
    report that the first parameter and the second parameter are associated with adjacent sectors of the same base station if the first message and the second message were received from the same base station.

20. A machine readable medium as defined in claim 19, wherein at least one of the first parameter or the second parameter is an identifying number.

21. A machine readable medium as defined in claim 20, wherein the identifying number is a pseudo-random number.

22. A machine readable medium as defined in claim 19, wherein the first parameter is associated with a first sector of the base station and the second parameter is associated with a second sector of the base station.

23. A machine readable medium as defined in claim 19, wherein to determine whether or not the first message and the second message were received from the same base station the instructions are to cause the machine to:
    extract the third parameter from the first message;
    determine whether or not the third parameter indicates that the first parameter and the second parameter are associated with the same base station;
    determine that the first message and the second message were received from the same base station when the third parameter indicates that the first parameter and the second parameter are associated with the same base station.

24. A machine readable medium as defined in claim 19, further comprising:

determining if a distance between the base station and a location receive the first message is greater than a threshold; and reporting that first parameter is spurious when the distance is greater than the threshold.

25. A machine readable medium as defined in claim 19, wherein to report that the first parameter and the second parameter are associated with the adjacent sectors of the same base station the instructions are to store the first parameter and the second parameter in a first record of a database.

* * * * *